(Specimens.)

G. SWEANOR.
METHOD OF SEPARATING METAL FROM QUARTZ OR GANGUE.

No. 386,504. Patented July 24, 1888.

WITNESSES
S. L. Schrader,
Edwin Sauter.

INVENTOR,
George Sweanor by
Paul Bakewell,
his attorney.

UNITED STATES PATENT OFFICE.

GEORGE SWEANOR, OF KINGSTON, TERRITORY OF NEW MEXICO.

METHOD OF SEPARATING METALS FROM QUARTZ OR GANGUE.

SPECIFICATION forming part of Letters Patent No. 386,504, dated July 24, 1888.

Application filed May 16, 1887. Serial No. 238,313. (Specimens.)

*To all whom it may concern:*

Be it known that I, GEORGE SWEANOR, a citizen of the United States, residing in the town of Kingston, county of Sierra, Territory of New Mexico, have discovered a certain new and useful Method of Separating Metals from Quartz or Gangue, of which the following is a full, clear, and exact description.

I have discovered that when finely-pulverized quartz containing metal is placed in a vessel containing water and a liquid which is insoluble in water, and which is also of a greater density than water, but of less density than the quartz or gangue, the quartz, although of greater density than the insoluble liquid, will float on the surface of the insoluble liquid at the bottom of the water, while whatever metal was previously mixed with the quartz precipitates through the insoluble liquid to the bottom of the vessel. It is obvious to those skilled in the art to which this discovery relates that, the discovery of this principle being disclosed, its application to practical use may be made by many different apparatuses, and that many different liquids of the character specified may be employed—such as carbon-bisulphide, chloroform, oil of cloves, and numerous others—which will readily suggest themselves to the skilled chemist, and therefore I do not intend to limit myself to any of the liquids herein named, but intend to extend the scope of the invention to any known liquid having the characteristics set forth.

Figure 1:
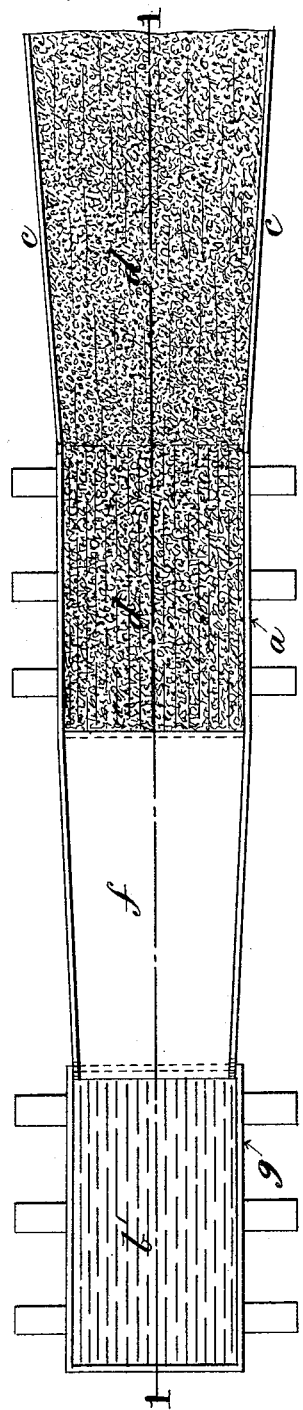
Figure 2:
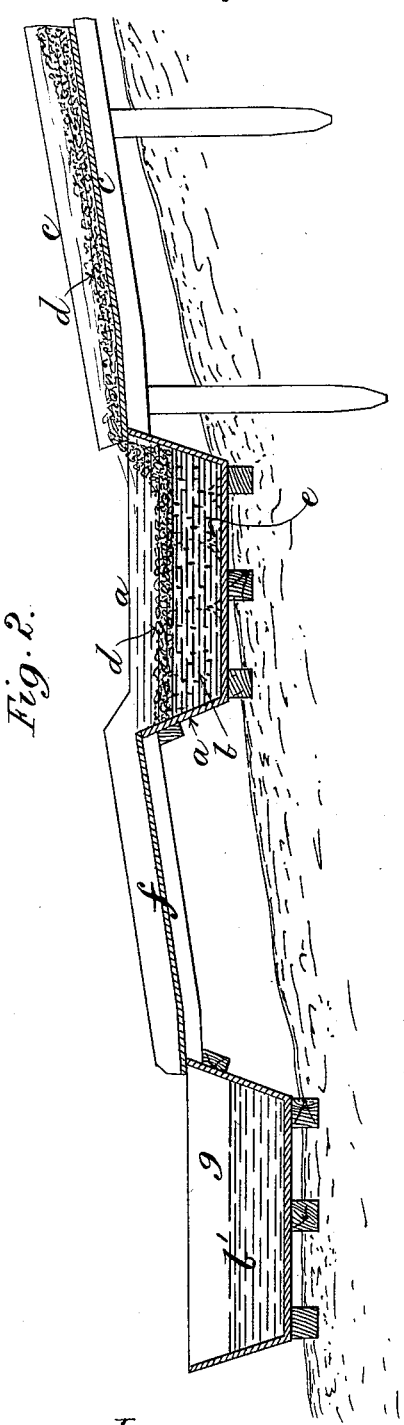

On the accompanying drawings, Figure 1 is a plan of one form of apparatus which may be used for effecting my discovery; and Fig. 2 a longitudinal section thereof on line 1 1 in Fig. 1, like letters of reference denoting like parts in both figures.

$a$ represents a suitably-shaped vessel containing a liquid, $b$, which is insoluble in water.

$c$ is a chute, down which the crushed quartz $d$, mixed with water, falls into the vessel $a$, where it floats on the surface of the insoluble liquid $b$, the metal $e$ precipitating (as shown by dots in Fig. 2) from the quartz $d$ to the bottom of the vessel $a$. As the process is continued, the quartz $b$, deprived of its metal, may be caused to flow over the top of the vessel $a$ and down the chute $f$ into a second vessel, $g$, also containing an insoluble liquid, $b'$, on which the quartz floats, so that any metal that has not precipitated from the quartz while passing over the surface of the insoluble liquid $b$ in the vessel $a$ is at length precipitated through the insoluble liquid $b'$ to the bottom of the vessel $g$.

If desired, any number of vessels containing the liquid may be used in the separation of the metals from their ores.

Any liquid insoluble in water and of greater density than water, but of less density than the quartz or gangue, can be used for carrying this discovery into effect, and the liquid having these properties which I prefer to use is carbon-bisulphide.

What I claim to have discovered, and desire to secure by Letters Patent, is—

The herein described method of separating metals from crushed quartz or gangue, which consists in discharging crushed quartz containing metal into a vessel containing water and a liquid insoluble in water and of greater density than water, but of less density than the quartz or gangue, whereby the crushed quartz will remain in and pass off with the water, whereas the metal will pass through the liquid (insoluble in water and of greater density than water) to the bottom of the vessel, substantially as described.

In testimony whereof I affix my signature, in presence of two witnesses, this 12th day of May, 1887.

GEORGE SWEANOR.

Witnesses:
   S. L. SCHRADER,
   EDWIN SAUTER.